US012580096B2

(12) United States Patent
Aramaki et al.

(10) Patent No.: US 12,580,096 B2
(45) Date of Patent: Mar. 17, 2026

(54) FOLDABLE WIRING MEMBER VIA SPLIT LINE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Osaka (JP); Housei Mizuno, Osaka (JP); Kyousyou Kou, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 181 days.

(21) Appl. No.: 18/571,973

(22) PCT Filed: Jun. 16, 2022

(86) PCT No.: PCT/JP2022/024070
§ 371 (c)(1),
(2) Date: Dec. 19, 2023

(87) PCT Pub. No.: WO2023/276687
PCT Pub. Date: Jan. 5, 2023

(65) Prior Publication Data
US 2024/0282478 A1 Aug. 22, 2024

(30) Foreign Application Priority Data
Jun. 30, 2021 (JP) ................................ 2021-109012

(51) Int. Cl.
*H01B 7/00* (2006.01)

(52) U.S. Cl.
CPC ................................ *H01B 7/0045* (2013.01)

(58) Field of Classification Search
None
See application file for complete search history.

(56) References Cited

U.S. PATENT DOCUMENTS 3,197,554 A * 7/1965 Baker .................. H01B 7/365 139/425 R
3,582,532 A * 6/1971 Plummer ............ H02G 3/0487 174/DIG. 11

(Continued)

FOREIGN PATENT DOCUMENTS

JP 62-40104 2/1987
JP 2013-127866 6/2013

(Continued)

OTHER PUBLICATIONS

Original and Translation of WO2020121433 (Year: 2020).*

(Continued)

*Primary Examiner* — Timothy J. Dole
*Assistant Examiner* — Muhammed Azam
(74) *Attorney, Agent, or Firm* — Greenblum & Bernstein, P.L.C.

(57) ABSTRACT

A wiring member includes a first connector, a second connector, a first wire-like transmission member connected to the first connector, a second wire-like transmission member connected to the second connector, and a sheet to which the first wire-like transmission member and the second wire-like transmission member are fixed. The first and second wire-like transmission members extend on the sheet in parallel to each other so that an end portion of the first wire-like transmission member connected to the first connector and an end portion of the second wire-like transmission member connected to the second connector are directed to a first end portion of the sheet. A split line for splitting the (Continued)

sheet is formed in the sheet, the split line extends between the first wire-like transmission member and the second wire-like transmission member, and one end portion of the split line reaches an edge of the first end portion.

7 Claims, 12 Drawing Sheets

(56) References Cited

U.S. PATENT DOCUMENTS 4,065,199 A * 12/1977 Andre ..................... H01B 7/08 174/72 A
4,888,071 A * 12/1989 Kauffman ............. H01B 7/306 174/117 FF
4,898,544 A * 2/1990 Callahan ............... H01R 12/67 439/470
4,912,595 A * 3/1990 Tanaka .................. H01G 4/228 29/25.42
5,651,694 A * 7/1997 Miyasaka ............. H05K 1/118 439/492
5,736,673 A * 4/1998 Lee ......................... H02G 3/26 220/3.3
6,469,252 B1 * 10/2002 Tanaka ................. B60R 16/027 174/117 F
6,630,625 B1 * 10/2003 Akashi .................. H01R 43/01 174/72 A
6,702,607 B2 * 3/2004 Kondo .................. H05K 1/118 174/72 A
6,723,925 B2 * 4/2004 Ohara ................ B60R 16/0207 174/117 FF
7,807,927 B2 * 10/2010 Yeh ..................... H01B 7/0838 174/117 FF
8,003,887 B1 * 8/2011 Hsieh .................. H02G 11/006 174/69
8,878,063 B2 * 11/2014 Mantock ................. H01B 7/30 174/117 FF
8,946,551 B2 * 2/2015 Hudson ............... H01B 7/0045 174/72 A
9,647,383 B2 * 5/2017 Lee ..................... H01R 13/506
10,410,761 B2 * 9/2019 Mizuno ................ H02G 3/0462
10,614,929 B2 * 4/2020 Kawaguchi ...... H01B 13/01281
10,819,094 B2 * 10/2020 Mizuno ................ H02G 3/0418
10,923,773 B2 * 2/2021 Michael ................. H05K 1/118
11,014,511 B2 * 5/2021 Nishimura .......... B60R 16/0215
11,152,135 B2 * 10/2021 Nishimura ........... H01B 7/0838
11,170,914 B2 * 11/2021 Mizuno .................... H02G 3/30
11,217,367 B2 * 1/2022 Aramaki .............. H01B 7/0846
11,322,270 B2 * 5/2022 Mizushita ........ H01B 13/01209
11,342,690 B2 * 5/2022 Fukushima ............ H01R 4/021
11,387,015 B2 * 7/2022 Fukushima .......... H01B 7/0846
11,451,036 B2 * 9/2022 Nishimura ............... H05K 7/00
11,501,894 B2 * 11/2022 Takakura ................. H01B 3/44
11,552,462 B2 * 1/2023 Nishimura .......... B60R 16/0215
11,837,861 B2 * 12/2023 Ishida ................. B60R 16/0215
11,854,720 B2 * 12/2023 Takakura ............... H01B 7/009
12,033,770 B2 * 7/2024 Aramaki ............. B60R 16/0215
12,097,811 B2 * 9/2024 Arai ................. H01B 13/01254
12,128,835 B2 * 10/2024 Nishimura ............... H02G 3/30
12,136,505 B2 * 11/2024 Yamasaki ................ H01B 7/08
12,142,396 B2 * 11/2024 Nishimura ........... H01B 7/0846
12,159,734 B2 * 12/2024 Tanaka ................. H01B 7/0846
12,249,442 B2 * 3/2025 Mizushita .............. H01B 7/188
12,300,406 B2 * 5/2025 Sumida .................... H01B 7/36
2003/0081394 A1 * 5/2003 Enomoto ............... H05K 3/326 361/777
2014/0204544 A1 * 7/2014 Tanaka ................... H05K 1/118 361/752
2016/0144808 A1 * 5/2016 Date .................... H02G 3/0481 174/72 A
2019/0252092 A1 * 8/2019 Mizuno ............... B60R 16/0215
2019/0392963 A1 * 12/2019 Ishida .................. H01B 7/0045
2021/0225556 A1 * 7/2021 Aramaki ............. H01B 7/0846
2022/0028585 A1 * 1/2022 Fukushima ............ H01B 19/00
2022/0212614 A1 * 7/2022 Sumida .................... H01B 7/04
2022/0234526 A1 * 7/2022 Sumida ............... B60R 16/0215
2022/0293299 A1 * 9/2022 Kudo ....................... H02G 3/30
2022/0388462 A1 * 12/2022 Nishimura ............... H02G 3/04
2023/0122992 A1 * 4/2023 Kou ..................... H01B 7/0846 174/72 A
2023/0154647 A1 * 5/2023 Kou ......................... H01B 7/17 174/72 A
2024/0140332 A1 * 5/2024 Fukushima .............. H02G 3/04
2024/0275146 A1 * 8/2024 Aramaki .................. H02G 3/04
2024/0282478 A1 * 8/2024 Aramaki .................. H02G 3/04
2025/0157693 A1 * 5/2025 Aramaki .................. H02G 3/04

FOREIGN PATENT DOCUMENTS

JP 2018-137208 8/2018
WO 2018/083979 5/2018
WO 2021/124984 6/2021

OTHER PUBLICATIONS

Original and Translation of WO2021124984 (Year: 2021).*

Original and Translation of WO2020122177 (Year: 2020).*

International Search Report issued in International Patent Application No. PCT/JP2022/024070, dated Sep. 6, 2022.

International Preliminary Report on Patentability issued in International Patent Application No. PCT/JP2022/024070, dated Dec. 14, 2023.

Japan, Notice of Reasons for Refusal received in Japanese Patent Application No. 2021-109012, dated Nov. 26, 2024.

* cited by examiner

FOLDABLE WIRING MEMBER VIA SPLIT LINE

TECHNICAL FIELD

The present disclosure relates to a wiring member.

BACKGROUND ART

Patent Document 1 discloses a wire harness in which an electrical wire is welded to a sheet-like functional exterior member.

PRIOR ART DOCUMENTS

Patent Document(s)

Patent Document 1: Japanese Patent Application Laid-Open No. 2018-137208

SUMMARY

Problem to be Solved by the Invention

A wire harness having a different part number may be prepared depending on a difference of a position of a connection target. It is desired to be able to correspond to a plurality of part number with a simple configuration.

Accordingly, an object is to provide a wiring member capable of corresponding to a plurality of part numbers with a simple configuration.

Means to Solve the Problem

A wiring member according to the present disclosure is a wiring member including: a first connector and a second connector; a first wire-like transmission member connected to the first connector; a second wire-like transmission member connected to the second connector; and a sheet to which the first wire-like transmission member and the second wire-like transmission member are fixed, wherein the first wire-like transmission member and the second wire-like transmission member extend on the sheet in parallel to each other so that an end portion of the first wire-like transmission member connected to the first connector and an end portion of the second wire-like transmission member connected to the second connector are directed to a first end portion of the sheet, a split line for splitting the sheet is formed in the sheet, the split line extends between the first wire-like transmission member and the second wire-like transmission member, and one end portion of the split line reaches an edge of the first end portion.

Effects of the Invention

According to the present disclosure, the wiring member can correspond to a plurality of part numbers with a simple configuration.

DESCRIPTION OF EMBODIMENT(S)

Description of Embodiment of Present Disclosure

Figure 1:
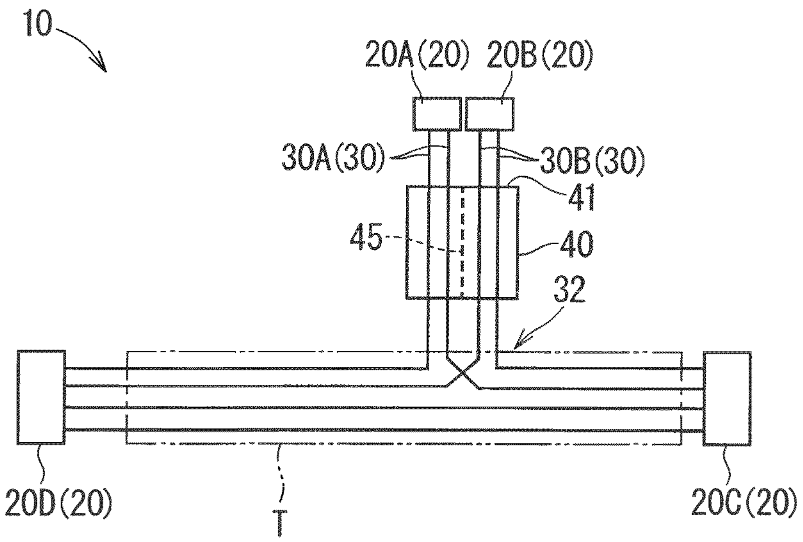
FIG. 1 is a schematic plan view illustrating a wiring member according to an embodiment 1.

Embodiments of the present disclosure are listed and described firstly.

A wiring member according to the present disclosure is as follows.

(1) A wiring member includes: a first connector and a second connector; a first wire-like transmission member connected to the first connector; a second wire-like transmission member connected to the second connector; and a sheet to which the first wire-like transmission member and the second wire-like transmission member are fixed, wherein the first wire-like transmission member and the second wire-like transmission member extend on the sheet in parallel to each other so that an end portion of the first wire-like transmission member connected to the first connector and an end portion of the second wire-like transmission member connected to the second connector are directed to a first end portion of the sheet, a split line for splitting the sheet is formed in the sheet, the split line extends between the first wire-like transmission member and the second wire-like transmission member, and one end portion of the split line reaches an edge of the first end portion. The split line extends between the first wire-like transmission member and the second wire-like transmission member, and one end portion of the split line reaches the edge of the first end portion, thus the wiring member can correspond to a plurality of part numbers by splitting a part of the sheet from the first end portion by the split line as necessary.

(2) In the wiring member according to (1), another end portion of the split line may be located in an intermediate region between the first end portion and the second end portion of the sheet. Accordingly, a complete separation of the sheet into two pieces is suppressed.

(3) It is applicable that the wiring member according to (2) further includes a third wire-like transmission member having one end portion connected to the first connector and another end portion connected to the second connector, wherein an intermediate part of the third wire-like transmission member is located in a position farther away from the first end portion than the split line, the third wire-like transmission member extends on one side of the split line in the sheet from the intermediate part of the third wire-like transmission member toward the one end portion, and extends on another side of the split line in the sheet from the intermediate part of the third wire-like transmission member toward the another end portion. Accordingly, even when the third wire-like transmission member connecting the first connector and the second connector is located, the wiring member can easily correspond to the plurality of part numbers with a simple configuration.

(4) In the wiring member according to any one of (1) to (3), a through hole may be formed in a position of an intermediate part of the split line in the sheet. Accordingly, a split of the sheet by the split line is suspended in the position of the through hole. The through hole can be a rough indication of an amount of splitting the split line in a case where an amount of splitting the split line is different depending on a part number.

(5) In the wiring member according to any one of (1) to (4), an intersection part where the first wire-like transmission member and the second wire-like transmission member intersect with each other on the sheet may be located in a position away from the split line. Accordingly, when the sheet is split at the split line, the intersection part as an obstacle is suppressed.

(6) In the wiring member according to any one of (1) to (5), it is applicable that the sheet is split at the split line to be separated into a first sheet part to which the wire-like transmission member is fixed and a second sheet part to which the second wire-like transmission member is fixed, and the first sheet part is folded back. Accordingly, the wiring member corresponding to a part number different from that in a case of not being split at the split line is obtained.

(7) In the wiring member according to (6), the sheet overlapped with each other may be fused and fixed in a part where the first sheet part is folded back. Accordingly, the wiring member can be simply held in a folded shape.

(8) In the wiring member according to (6) or (7), it is applicable that the first sheet part is folded back to extend across the second sheet part, and the first sheet part and the second sheet part overlapped with each other may be fixed to each other. Accordingly, even when there is a small margin part in the sheet, the folded part is easily fixed.

(9) In the wiring member according to any one of (6) to (8), the first wire-like transmission member is fixed to the sheet at a plurality of positions at intervals along an extension direction, and a position where the first wire-like transmission member and the sheet are fixed to each other is located in a folded part of the first sheet part. Accordingly, when the first wire-like transmission member is folded back with the first sheet part, the first wire-like transmission member is hardly separated from the first sheet part.

Detailed Description of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
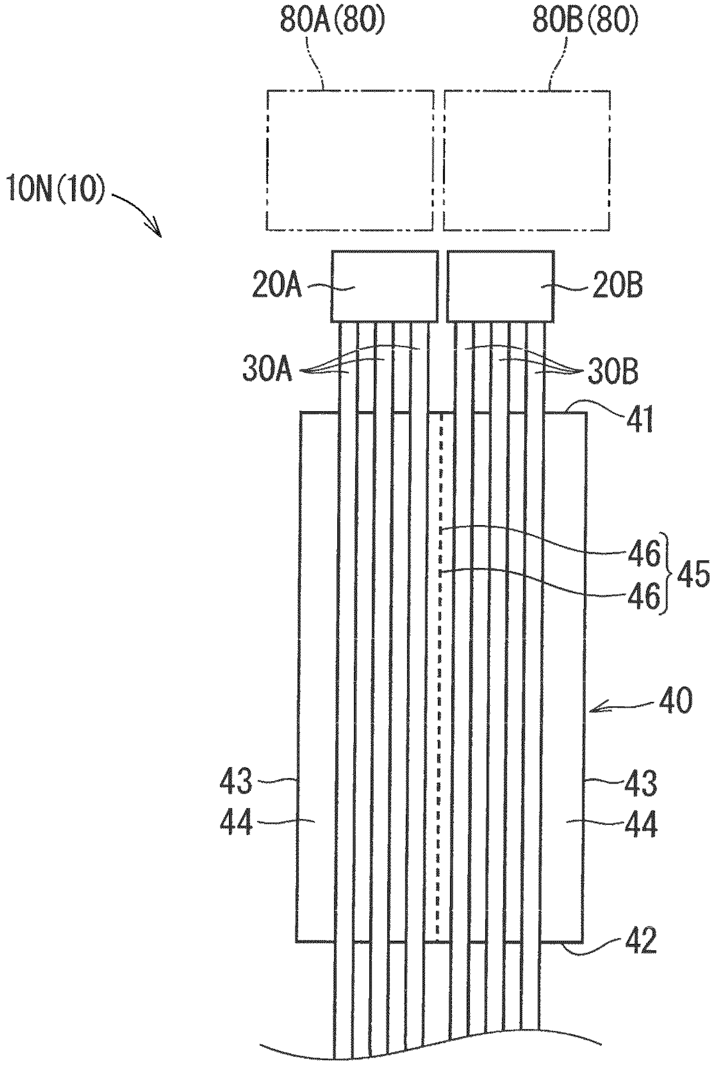
FIG. 2 is a partial enlarged view of FIG. 1, and is a diagram illustrating a wiring member corresponding to a first part number.

A wiring member according to an embodiment 1 is described hereinafter. FIG. 1 is a schematic plan view illustrating a wiring member 10 according to the embodiment 1. FIG. 2 is a partial enlarged view of FIG. 1.

The wiring member 10 electrically connects various types of component in a vehicle, for example (or connects them so that they can perform optical communication). The wiring member 10 transmits electricity or light, thereby supplying electrical power to an apparatus or transmitting a signal between apparatuses. The wiring member 10 includes a plurality of connectors 20, a plurality of wire-like transmission members 30, and a sheet 40. Each connector 20 is connected to the other side connector 80 provided in a connection destination. Each wire-like transmission member 30 connects the connectors 20. At least an intermediate section of the wire-like transmission member 30 is fixed to the sheet 40.

It is sufficient that the connector 20 can be electrically connected to the other side connector 80 (or connected to the other side connector 80 so that they can perform optical communication). For example, the connector 20 may include a connector terminal and a connector housing. The connector 20 and the other side connector 80 are fitted to each other, thus the connector terminal is connected to the connector terminal of the other side connector 80. The plurality of connector terminals are normally provided to one connector 20. The connector housing keeps the connector terminal in a state of being connectable to the connector terminal of the other side connector 80. The connector housing keeps the plurality of connector terminals in a predetermined arrangement order. When the wiring member 10 transmits electricity, the connector terminal is normally made up of a conductor such as metal, and the connector housing is made up of an insulator such as resin. The connector terminal may be connected to an end portion of the electrical wire by crimping connection, for example. In the example illustrated in FIG. 1, the wiring member 10 includes four connectors 20. Needless to say, the number of the connectors 20 included in the wiring member 10 is not limited thereto, however, three or less or five or more connectors 20 are also applicable.

The wire-like transmission member 30 is a wire-like member transmitting electricity or light, for example. The wire-like transmission member 30 includes a transmission wire body and a covering layer. The transmission wire body is a transmission route transmitting electricity or light. For example, when the wire-like transmission member 30 is an electrical wire, the transmission wire body is a conductor core wire. The conductor core wire is made up of one or a plurality of strands. The strand is formed of copper, copper alloy, aluminum, or aluminum alloy as a material, for example. For example, when the wire-like transmission member 30 is an optical fiber, the transmission wire body is a core and a clad. The covering layer covers the transmission wire body. A resin material constituting the covering layer is not particularly limited, but can be appropriately set. For example, the wire-like transmission member 30 may be a general wire having a core wire and a covering layer around the core wire, or may also be a shield wire, a twisted wire, an enamel wire, a nichrome wire, or an optical fiber.

The wire-like transmission member 30 transmitting the electricity may be various kinds of signal lines or various kinds of power lines. Some of the wire-like transmission members 30 transmitting the electricity may be used as an antenna or coil, for example, transmitting or receiving a signal or electrical power to or from a space.

The wire-like transmission member 30 may be a single core wire. The single core wire is a single wire-like object. The single core wire is the wire-like transmission member 30 with one transmission route. The wire-like transmission member 30 may be a multicore wire. The multicore wire is a compound body of a plurality of wire-like objects. The multicore wire is the wire-like transmission member 30 with a plurality of transmission routes. The multicore wire may be a cable made up of collected twisted wires or a plurality of wire-like objects covered by a sheath, for example.

The plurality of wire-like transmission members 30 connect four connectors 20. When four connectors 20 need to be distinguished, they are referred to as the connectors 20A, 20B, 20C, and 20D in some cases hereinafter. The wire-like transmission member 30 having one end portion connected to the connector 20A in the plurality of wire-like transmission members 30 is referred to as the wire-like transmission member 30A. The wire-like transmission member 30 having one end portion connected to the connector 20B in the plurality of wire-like transmission members 30 is referred to as the wire-like transmission member 30B. The wire-like transmission member 30A and the wire-like transmission member 30B extend on the sheet 40 in parallel to each other so that an end portion of the wire-like transmission member 30A connected to the connector 20A and an end portion of the wire-like transmission member 30B connected to the connector 20B are directed to a first end portion 41 of the sheet 40. One of the connectors 20A and 20B is an example of the first connector, and the other one thereof is an example of the second connector. One of the wire-like transmission members 30A and 30B is an example of the first wire-like transmission member, and the other one thereof is an example of the second wire-like transmission member.

In the example illustrated in FIG. 1, both end portions of the wire-like transmission members 30A and 30B extend to an outer side from the first end portion 41 and the second end portion 42 of the sheet 40. The connectors 20A and 20B are provided to an outer side of the sheet 40. The connectors 20A and 20B are provided away from the sheet 40. The connectors 20A and 20B are not fixed to the sheet 40. The end portions of the wire-like transmission members 30A and 30B may be located on the sheet 40. The connectors 20A and 20B may be provided on the sheet 40. The connectors 20A and 20B may be fixed to the sheet 40.

In the present example, the other end portion of the wire-like transmission member 30A and the other end portion of the wire-like transmission member 30B are branched at a branch part 32, and are connected to the connector 20C or the connector 20D. A section including one end portions of the wire-like transmission members 30A and 30B extend from the branch part 32 to the same direction toward the connectors 20A and 20B.

An adhesive tape T is wound around a part of the wire-like transmission members 30A and 30B between the sheet 40 and the connectors 20C and 20D to bundle the part. A branch shape of the branch part 32 is kept by the adhesive tape T. The part of the wire-like transmission members 30A and 30B between the sheet 40 and the connectors 20A and 20B is not wound by a tape. The part between the sheet 40 and the connectors 20A and 20B may be wound by a tape.

An exterior member different from the adhesive tape T may be attached between the sheet 40 and the connectors 20A and 20B and between the sheet 40 and the connectors 20C and 20D in the wire-like transmission members 30A and 30B. The exterior member may be a protection sheet, a protection tube, or a resin molded protector, for example.

In the example illustrated in FIG. 2, both the number of the wire-like transmission members 30A and the number of the wire-like transmission members 30B are three. The number of the wire-like transmission members 30A and 30B can be appropriately set. The number of the wire-like transmission members 30A and 30B may be two or less or four or more. The number of the wire-like transmission members 30A and 30B may not be the same as each other.

The wire-like transmission member 30A and 30B are fixed to the sheet 40. The wire-like transmission members 30A and 30B are arranged on a first surface of the sheet 40. The plurality of wire-like transmission members 30A and 30B are held to be arranged on the first surface of the sheet 40. Accordingly, the wiring member 10 is flattened in a part thereof where the sheet 40 is located by reducing a dimension in a height direction in relation to dimensions in a width direction and a length direction.

It is sufficient that the sheet 40 can fix the wire-like transmission member 30, thus a material and a structure, for example, are not particularly limited. With regard to a material constituting the sheet 40, the sheet 40 is formed of a resin material herein. A material other than resin such as metal or an inorganic material, for example, may be used for the material constituting the sheet 40. With regard to the structure of the sheet 40, the sheet 40 has a double layer structure herein. The structure of the sheet 40 may be a single layer structure, or a multilayer structure of three or more layers is also applicable.

The sheet 40 includes a first layer and a second layer. The first layer is a fusion layer. The wire-like transmission member 30 is fused and fixed to the fusion layer. The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer is not particularly limited. For example, the fusion layer may be a sheet having an evenly filled cross-sectional surface (also referred to as a non-foam sheet or a solid sheet, for example). The fusion layer is also considered a foam sheet, for example. The fusion layer is also considered a fibrous material sheet such as a braided cloth, a woven cloth, or a non-woven cloth, for example. One surface of the first layer is a first surface of the sheet 40.

The second layer is formed of a material different from that of the fusion layer, or has a different structure. The second layer increases a function of the fusion layer, or adds a function which the fusion layer does not have to the sheet 40. A material constituting the second layer is a material described for the fusion layer described above, metal, or an inorganic material, for example. A structure of the second layer may be any of the structure described for the fusion layer described above. One surface of the second layer is a second surface of the sheet 40.

The first layer and the second layer are fixed to each other while the other surface of the first layer and the other surface of the second layer have contact with each other. A fixing state of the first layer and the second layer is not particularly limited, however, fixing by fusion or adhesion is preferable. For example, when at least one of the first layer and/or the second layer is a sheet having voids in a surface such as a fibrous material sheet or a foam sheet, a resin material or an adhesive agent enters the voids and the layers can be fixed to each other. Such a configuration causes so-called anchor effect, thus the first layer and the second layer are rigidly fixed.

In the description herein, the first layer is a solid sheet made of resin and the second layer is a fibrous material sheet. In the description herein, the first layer and the second layer are fused to each other. That is to say, the resin of the first layer enters between the fibers of the second layer while having flowability, and is then hardened. Maintained accordingly is a state where the resin of the first layer enters between the fibers of the second layer, and the first layer and the second layer are rigidly fixed to each other.

The first layer and the second layer are formed to have the same size (the same planar shape). One of the first layer and the second layer may also be formed to be larger than the other one thereof. The first layer and the second layer are wholly fixed at a region where they have contact with each other. The first layer and the second layer may also be fixed only at a part of a region where they have contact with each other.

The sheet 40 may be a flexible member. For example, the first layer is a solid sheet made up of flexible resin such as flexible PVC as a material, the second layer is a non-woven cloth made up of PET as a material, and the sheet 40 is a flexible member. The sheet 40 may have flexibility so as to be able to follow bending of the wire-like transmission member 30. The wiring member 10 can be bended in a thickness direction (bending so that a fold line follows the main surface of the sheet 40). The sheet 40 can be folded back. In the wiring member 10, the wire-like transmission member 30 and the sheet 40 can be folded back at the position of the sheet 40.

Figure 3:
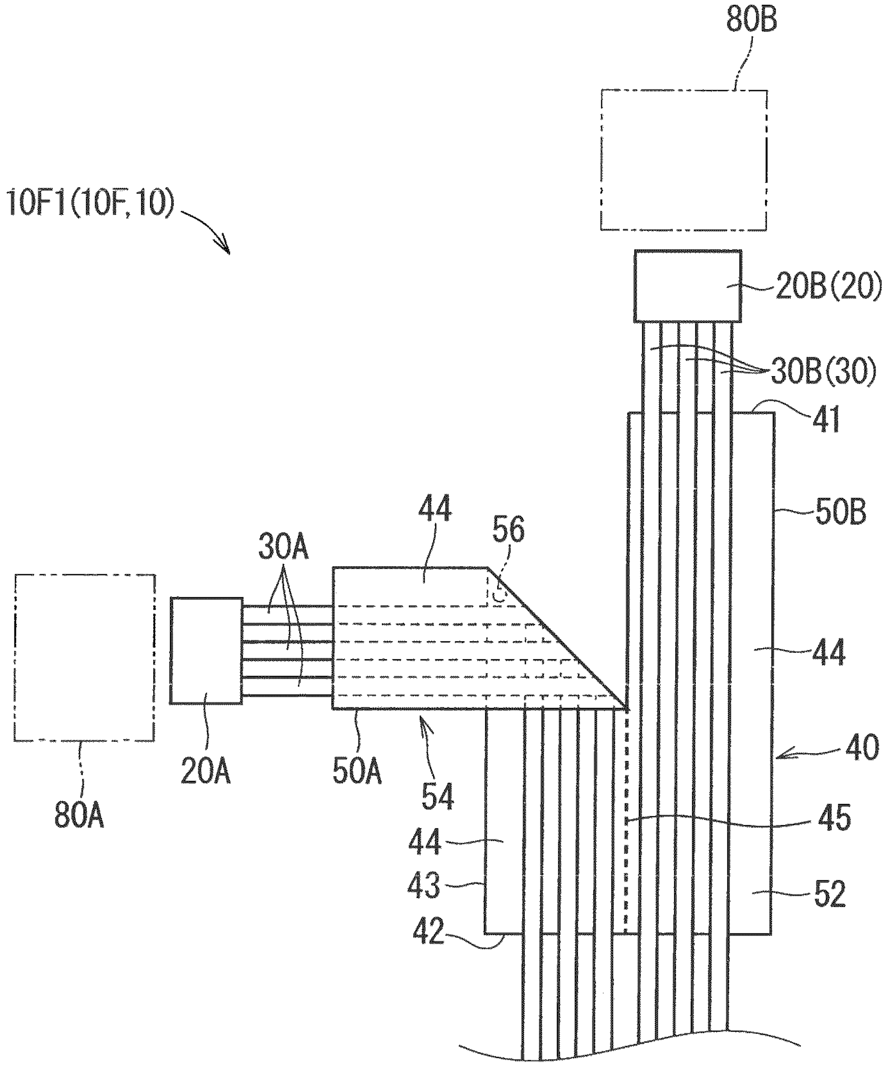
FIG. 3 is a diagram illustrating a wiring member corresponding to a second part number.

The wiring member 10 is a wiring member corresponding to the other part number by folding back and deforming a part of the wire-like transmission member 30 and the sheet 40. The plurality of part numbers in the present disclosure occur when routes of some wire-like transmission members 30 are different from each other. A route of the wire-like transmission member 30 is set in accordance with a position of a component to which the wire-like transmission member 30 is connected, for example. When the wiring member 10 needs to be distinguished for each part number, a code is added for distinction hereinafter. For example, in a wiring member 10N illustrated in FIG. 2, a part of the wire-like transmission member 30 and the sheet 40 is not folded back and deformed. For example, a wiring member 10F illustrated in FIG. 3 is formed by folding back and deforming a part of the wire-like transmission member 30 and the sheet 40 in the wiring member 10N. The wiring member 10F is derived from the wiring member 10N. In the present disclosure, when the wiring member 10N and at least one wiring member 10F derived from the wiring member 10N need not be distinguished, they are collectively referred to as the wiring member 10.

The sheet 40 is formed into a shape corresponding to one part number. The route of the wire-like transmission members 30A and 30B in the sheet 40 is a route corresponding to the one part number. The sheet 40 is formed into a shape in accordance with the route of the wire-like transmission members 30A and 30B corresponding to one part number. The wire-like transmission members 30A and 30B are fixed to the sheet 40, thus the wire-like transmission members 30A and 30B are kept in a form following a wiring route corresponding to one part number. In the example illustrated in FIG. 1, the sheet 40 holds a straight route of the wire-like transmission members 30A and 30B. The sheet 40 is formed into a shape corresponding to the straight route. A part of the wire-like transmission member 30 and the sheet 40 is folded back and deformed, thus the route of some wire-like transmission member 30 is changed, and can correspond to the other part number.

Any fixing state may be applied as a fixing state of fixing the sheet 40 and the wire-like transmission member 30. Applicable as the fixing state are a contact area fixation and a non-contact area fixation, or both fixations may be used together. Herein, the contact area fixation indicates that a portion where the sheet 40 and the wire-like transmission member 30 have contact with each other is stuck and fixed. The non-contact area fixation is a fixing state which is not the contact area fixation, and indicates that a sewing thread, a cover, or an adhesive tape presses the wire-like transmission member 30 toward the sheet 40 or sandwiches the sheet 40 and the wire-like transmission member 30 to keep them in a fixing state. In the description hereinafter, the sheet 40 and the wire-like transmission member 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the sheet 40 and the wire-like transmission member 30 are indirectly stuck and fixed via an adhesive member such as an adhesive agent, a gluing agent, and a double-sided adhesive tape provided therebetween. The contact area direct fixation indicates that the sheet 40 and the wire-like transmission member 30 are directly stuck and fixed without an intervention of the adhesive agent, for example, which is separately provided. Considered in the contact area direct fixation is that resin included in at least one of the sheet 40 and/or the wire-like transmission member 30 is melted, thus the sheet 40 and the wire-like transmission member 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. Herein, the sheet 40 and the wire-like transmission member 30 are fused to each other. In this case, the fusion layer of the sheet 40 and an outermost layer of the wire-like transmission member 30 are fused to each other. The outermost layer of the wire-like transmission member 30 is the covering layer. It is sufficient that a material of the covering layer and a material of the fusion layer have compatibility. Herein, a resin material constituting the covering layer and a resin material constituting the fusion layer are the same type of material. A resin material constituting the fusion layer and a resin material constituting the covering layer are PVC or polyolefin, for example.

Each of the wire-like transmission members 30A and 30A is fixed to the sheet 40 by contact area direct fixation not by the other wire-like transmission member 30. Even when the state of the contact area direct fixation of any of the plurality of wire-like transmission members 30A and 30B is resolved, the state of the contact area direct fixation of the other wire-like transmission member is not resolved.

The fixing part where the sheet 40 and the wire-like transmission member 30 are fixed is continuously provided along the extension direction of the wire-like transmission member 30. The fixing part where the sheet 40 and the wire-like transmission member 30 are fixed may be provided over a whole length of the sheet 40. The fixing part where the sheet 40 and the wire-like transmission member 30 are fixed may be provided in a plurality of positions at intervals along the extension direction of the wire-like transmission member 30.

A split line 45 is formed in the sheet 40. The split line 45 is provided to split the sheet 40. A split of the sheet 40 using the split line 45 is performed more easily than a split of the sheet 40 in a position where the split line 45 is not located. The split line 45 is formed by processing a part of the sheet 40. Herein, a perforated line 45 is formed as the split line 45. The plurality of perforations 46 are intermittently formed in a predetermined direction to form the perforated line 45. The split line 45 needs not be the perforated line 45, however, any configuration is applicable as long as it facilitates the split of the sheet 40. For example, the split line 45 may be a groove in which a part of the sheet 40 is concaved in a thickness direction. The groove is formed, thus force on split is easily concentrated on the groove.

The split line 45 extends between the wire-like transmission member 30A and 30B. The wire-like transmission member 30A and the wire-like transmission member 30 are arranged at intervals in a parallel direction on the sheet 40. Three wire-like transmission members 30A are arranged at intervals in the parallel direction. Three wire-like transmission members 30B are arranged at intervals in the parallel direction. Each interval can be appropriately set. Herein, the interval between the wire-like transmission members 30A is the same as that between the wire-like transmission members 30B. The interval between the wire-like transmission member 30A and the wire-like transmission member 30B is larger than that between the wire-like transmission members 30A. The interval between the wire-like transmission member 30A and the wire-like transmission member 30B is larger than that between the wire-like transmission members 30A. Three wire-like transmission members 30A may be arranged to have contact with each other in the parallel direction.

One end portion of the split line 45 reaches an edge of the first end portion 41. When the split line 45 is the perforated line, the state where one end portion of the split line 45 reaches the edge of the first end portion 41 indicates a case where a perforation 46 is located in the edge of the first end portion 41 or a case where the perforation 46 is not located in the edge of the first end portion 41 but is located on a slightly inner side of the edge of the first end portion 41. In the present example, the other end portion of the split line 45 reaches an edge of the second end portion 42. Accordingly, the split line 45 wholly extends along the longitudinal direction of the sheet 40. The other end portion of the split line 45 may not reach the edge of the second end portion 42.

A side edge 43 of the sheet 40 and the wire-like transmission member 30 are away from each other. A margin part 44 occurs between the side edge 43 of the sheet 40 and the wire-like transmission member 30 in the sheet 40. The margin part 44 is used to fix the sheet 40 to a vehicle, for example. A width dimension of the margin part 44, that is to say, a distance from the side edge 43 of the sheet 40 to the wire-like transmission member 30 in the sheet 40 can be appropriately set. Herein, the width dimension of the margin part 44 is larger than the interval between the wire-like transmission members 30A. The width dimension of the margin part 44 is larger than the interval between the wire-like transmission members 30A and 30B.

<Support for Plurality of Part Numbers>

A support for the plurality of part numbers using the wiring member 10 described above is described.

<First Part Number>

A first part number is the wiring member 10N which is not folded back as illustrated in FIG. 2. The split line 45 is not split in the wiring member 10N. The split line 45 may be split in the wiring member 10N to an extent that the sheet part split and divided cannot be folded back. Both the other side connectors 80A and 80B of the connectors 20A and 20B in the wiring member 10N are located on an outer side of the first end portion 41.

<Second Part Number>

Figure 4:
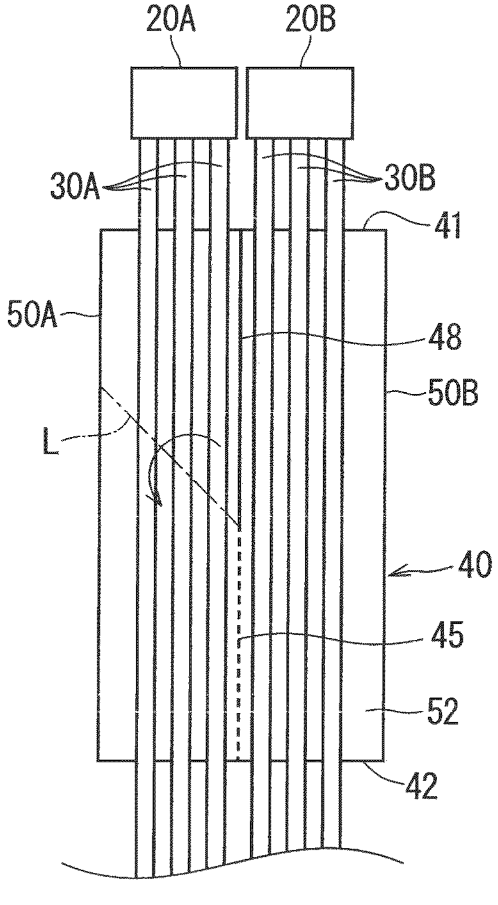
FIG. 4 is a diagram illustrating a manufacture of the wiring member corresponding to the second part number.

A second part number is further described with reference to FIG. 3 and FIG. 4. The second part number is the wiring member 10F which is folded back. FIG. 3 is a diagram illustrating the wiring member 10F corresponding to the second part number. FIG. 4 is a diagram illustrating a manufacture of the wiring member 10F corresponding to the second part number. When the plurality of wiring members 10F which are folded back and have a folding state different from each other need to be distinguished, they are referred to as wiring members 10F1 and 10F2, for example, in some cases hereinafter. When the wiring members 10F1 and 10F2 need not be distinguished, they are collectively referred to as the wiring member 10F in some cases.

In the wiring member 10F, the sheet 40 is split at the split line 45 and divided into two sheet parts 50A and 50B. The wire-like transmission member 30A is fixed to the sheet part 50A. The wire-like transmission member 30B is fixed to the sheet part 50B. One of the sheet parts 50A and 50B is an example of a first sheet part, and the other one thereof is an example of a second sheet part. When only one of two sheet parts 50A and 50B is folded back, one of two sheet parts 50A and 50B which is folded back is the first sheet part.

In the wiring member 10F1 according to the present example, the sheet part 50A is folded back, thus a folded part 54 occurs. The folded part 54 is folded back to be away from the sheet part 50B. The folded part 54 is not overlapped with the sheet part 50B. The other side connector 80B of the connector 20B is located on the outer side of the first end portion 41, and the other side connector 80A of the connector 20A is located on the outer side of the side edge 43 in the wiring member 10F1.

The sheet 40 overlapped with each other is fixed in a part where the sheet part 50A is folded back to form a sheet fixing part 56. The folded part 54 and a part which is not folded back are overlapped with each other. In the present example, the sheet part 50A is overlapped with each other. The sheet part 50A is fixed to each other in the sheet fixing part 56. The fixing state in the sheet fixing part 56 is not particularly limited, but can be appropriately set. For example, the sheet fixing part 56 may be fixed in any fixing state described in the fixing state of fixing the sheet 40 and the wire-like transmission member 30 described above.

In the present example, the sheet 40 overlapped with each other is fused and fixed. In the present example, a part where the sheet part 50A is overlapped with each other with no wire-like transmission member 30 therebetween is fused. In the example illustrated in FIG. 3, the margin part 44 facing each other is fused to each other.

In the example illustrated in FIG. 3, the sheet 40 is split to an intermediate part between the first end portion 41 and the second end portion 42. The sheet 40 includes a sheet body 52 which is not split. The sheet parts 50A and 50B are connected to the sheet body 52. The sheet part 50A is connected to one side of the sheet body 52 along a width direction thereof, and the sheet part 50B is connected to the other side thereof.

In the example illustrated in FIG. 3, the wiring member 10F1 is folded back so that the wire-like transmission member 30 is located on an inner side and the sheet part 50A is located on an outer side. The wiring member 10F1 may be folded back so that the wire-like transmission member 30 is located on an outer side and the sheet part 50A is located on an inner side.

In the wiring member 10F1, the extension direction of the sheet part 50A after being folded back and the extension direction of the sheet part 50A before being folded back are perpendicular to each other. In this case, a fold line extends in a direction having an angle of 45 degrees with the extension direction of the sheet part 50A before being folded back.

The wiring member 10N described above is firstly prepared in manufacturing the wiring member 10F1. The sheet 40 is split from the first end portion 41 using the split line 45 in the wiring member 10N. An amount of splitting the sheet 40 is set in accordance with a part number. In the example illustrated in FIG. 4, the sheet 40 is split to the intermediate part of the split line 45. When the sheet 40 is split, a trace of the split line 45 becomes a slit 48, and the sheet 40 is divided by the slit 48 to form two sheet parts 50A and 50B. One sheet part 50A and the wire-like transmission member 30A disposed on the sheet part 50A are folded back. The example illustrated in FIG. 4 indicates a fold line L corresponding to the part number. The fold line L is a virtual line, and is not a line formed in the wiring member 10. The fold line L may be formed in the wiring member 10. The sheet 40 folded back and overlapped with each other is fixed. Herein, the sheet part 50A overlapped with each other is fused to each other. The wiring member 10F1 is thereby made.

<Third Part Number>

Figure 5:
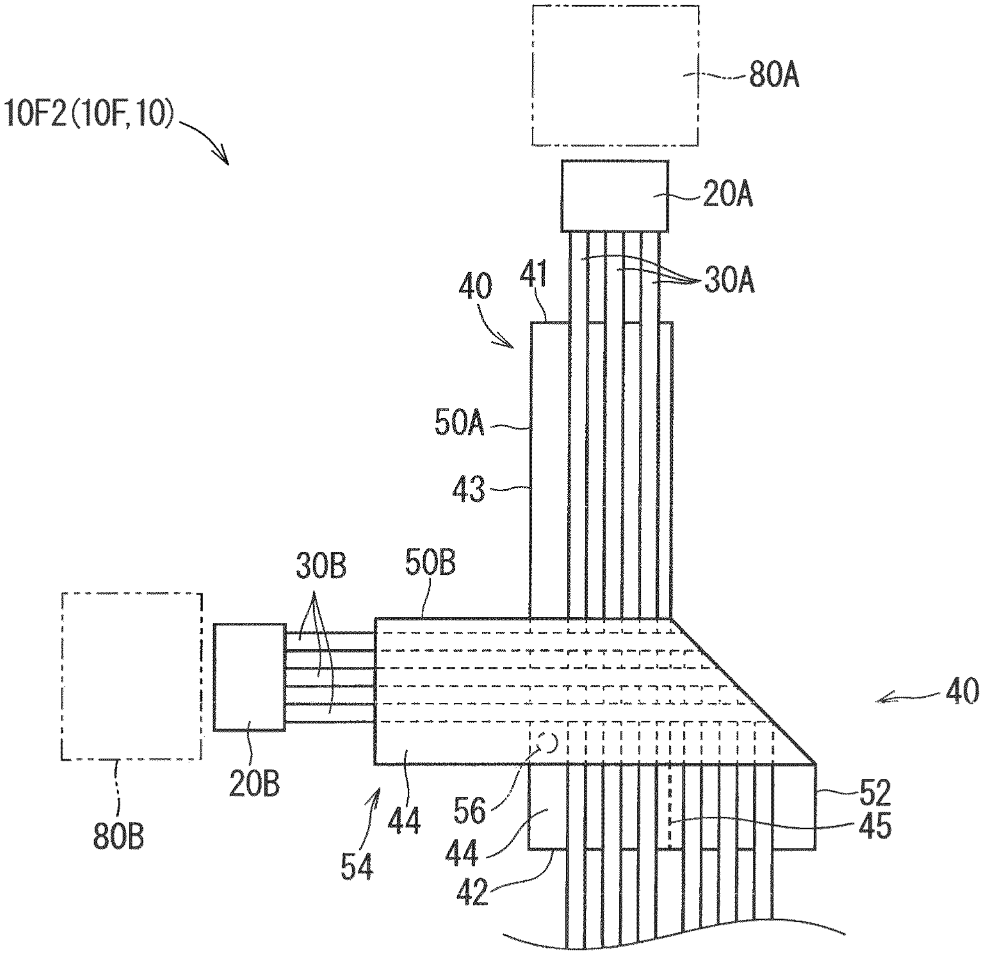
FIG. 5 is a diagram illustrating a wiring member corresponding to a third part number.
Figure 6:
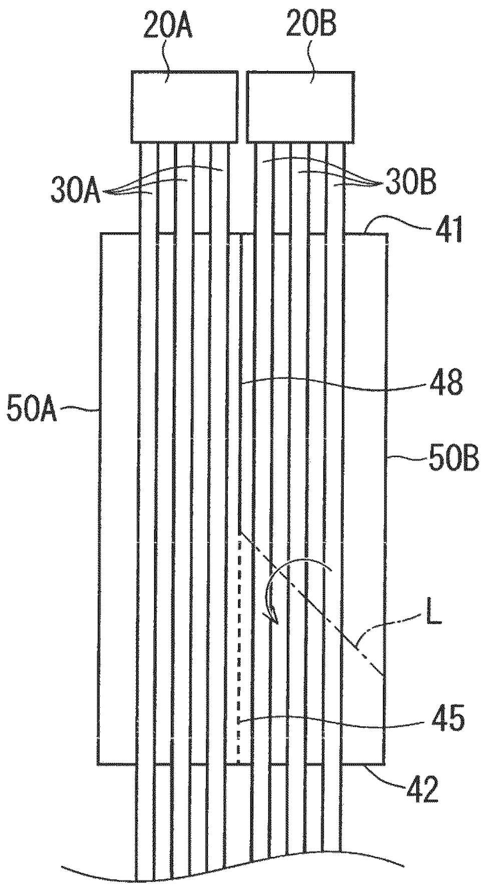
FIG. 6 is a diagram illustrating a manufacture of the wiring member corresponding to the third part number.

A third part number is further described with reference to FIG. 5 and FIG. 6. FIG. 5 is a diagram illustrating the wiring member 10F2 corresponding to the third part number. FIG. 6 is a diagram illustrating a manufacture of the wiring member 10F2 corresponding to the third part number.

The wiring member 10F2 according to the present example is also folded back. A folding state of the wiring member 10F2 according to the present example is different from that of the wiring member 10F1 described above.

In the wiring member 10F2, the sheet part 50B is folded back, thus the folded part 54 occurs. The sheet part 50B is folded back to extend across the sheet part 50A. The other side connector 80A of the connector 20A is located on the outer side of the first end portion 41, and the other side connector 80B of the connector 20B is located on the outer side of the side edge 43 in the wiring member 10F2.

The sheet part 50A and the sheet part 50B overlapped with each other are fixed to each other in the sheet fixing part 56. The margin part 44 of the sheet part 50A and the margin part 44 of the sheet part 50B are fixed to each other. The sheet fixing part 56 of the wiring member 10F2 can be provided farther away from the fold line along a perpendicular direction of the fold line than the sheet fixing part 56 of the wiring member 10F1. Thus, the sheet 40 overlapped with each other in a part other than the sheet fixing part 56 is hardly opened. The sheet fixing part 56 may be provided in a position similar to the wiring member 10F2 in the wiring member 10F1. For example, the margin part 44 between the side edge 43 of the sheet 40 and the wire-like transmission member 30 by splitting the sheet 40 at the split line 45 may be fused and fixed to the margin part 44 between the side edge 43 of the sheet 40 before being split and the wire-like transmission member 30 in the wiring member 10F1.

The wiring member 10N described above is firstly prepared in manufacturing the wiring member 10F2. The sheet 40 is split from the first end portion 41 using the split line 45 in the wiring member 10N. An amount of splitting the sheet 40 is set in accordance with a part number. In the example illustrated in FIG. 6, the sheet 40 is split to the intermediate part of the split line 45. When the sheet 40 is split, a trace of the split line 45 becomes the slit 48, and the sheet 40 is divided by the slit 48 to form two sheet parts 50A and 50B. One sheet part 50B and the wire-like transmission member 30B disposed on the sheet part 50B are folded back. The example illustrated in FIG. 6 indicates the fold line L corresponding to the part number. The fold line L is a virtual line, and is not a line formed in the wiring member 10. The fold line L may be formed in the wiring member 10. The sheet 40 folded back and overlapped with each other is fixed. Herein, the sheet part 50A and the sheet part 50B are fused to each other. The wiring member 10F2 is thereby made.

<Other Part Number>

The wiring member 10 according to the present example can correspond to a part number other than the first part number to the third part number described above. For example, it is applicable that the split line 45 is split as illustrated in FIG. 4 or FIG. 6, and one of the sheet part 50A and the sheet part 50B is not bended but extends toward an upper side of a paper sheet of the drawings, and the other one thereof is bended. For example, it is applicable that the split line 45 is split as illustrated in FIG. 4 or FIG. 6, and one of the sheet part 50A and the sheet part 50B is bended to a left side of the paper sheet, and the other one thereof is bended to a right side thereof. An angle of bending the sheet part 50A or the sheet part 50B may be smaller than 90 degrees, or may also be larger than 90 degrees. An amount of splitting the split line 45 may be smaller or larger than that in the example in the drawings.

<Effect Etc.>

According to the wiring member 10 having the above configuration, the split line 45 extends between the wire-like transmission member 30A and the wire-like transmission member 30B, and one end portion of the split line 45 reaches the edge of the first end portion 41, thus the wiring member 10 can correspond to the plurality of part numbers by splitting a part of the sheet 40 from the first end portion 41 by the split line 45 as necessary.

According to the wiring member 10F, the sheet 40 is split at the split line 45 and divided into the sheet part 50A to which the wire-like transmission member 30A is fixed and the sheet part 50B to which the wire-like transmission member 30B is fixed, and the first sheet part is folded back. Accordingly, the wiring member 10F corresponding to a part number different from that in a case of not being split at the split line 45 is obtained.

The sheet 40 overlapped with each other is fused and fixed in a part where the first sheet part is folded back. Accordingly, the wiring member 10F can be simply held to have a folded shape.

According to the wiring member 10F2, the sheet part 50B is folded back to extend across the sheet part 50A, and the sheet part 50A and the sheet part 50B overlapped with each other are fixed to each other. Accordingly, even when there is the small margin part 44 in the sheet 40, the folded part 54 is easily fixed.

Embodiment 2

Figure 7:
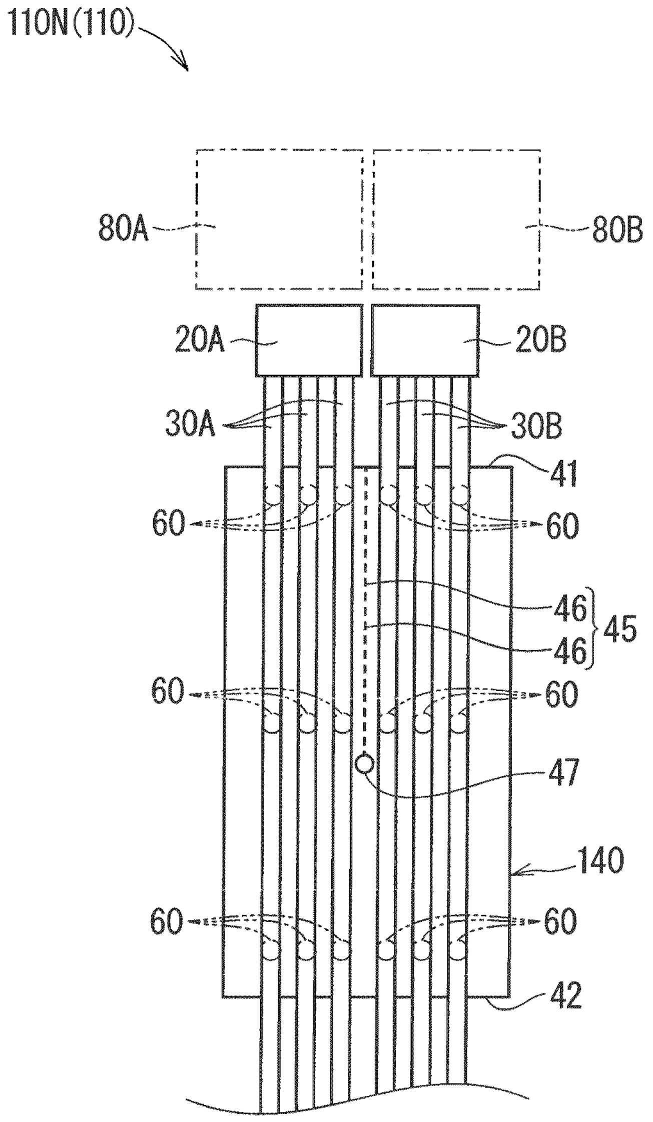
FIG. 7 is a plan view illustrating a wiring member according to an embodiment 2.
Figure 8:
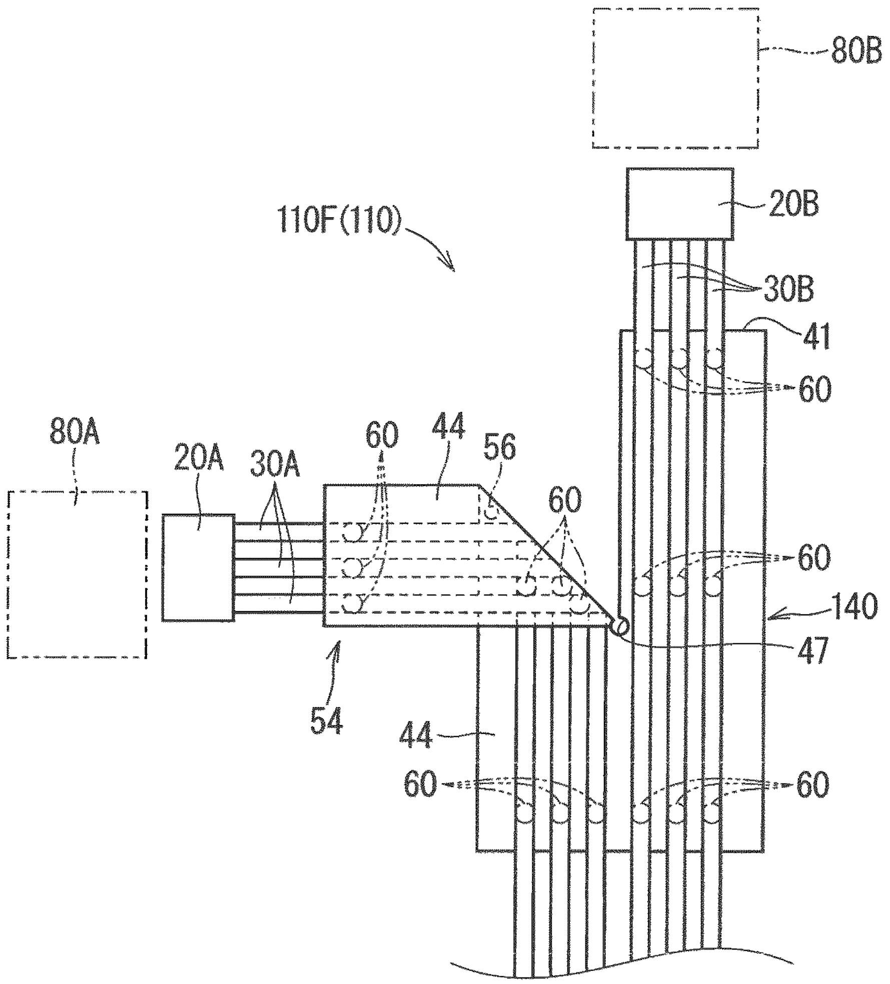
FIG. 8 is a plan view illustrating another part number of the wiring member according to the embodiment 2.

A wiring member according to an embodiment 2 is described. FIG. 7 is a plan view illustrating a wiring member 110 according to the embodiment 2. FIG. 8 is a plan view illustrating the wiring member 110 according to the embodiment 2. FIG. 7 illustrates a wiring member 110N which is not folded back, and FIG. 8 illustrates a wiring member 110F which is folded back. In the following description of each embodiment and each modification example, the same reference numerals are assigned to the similar constituent elements described in the embodiment 1, and the description thereof will be omitted.

In the wiring member 110 according to the present example, the position of the other end portion of a split line 145 is different from the position of the other end portion of the split line 45 in the wiring member 10 described above. In the wiring member 110, the other end portion of the split line 145 is located in an intermediate region between the first end portion 41 and the second end portion 42 of a sheet 140. Accordingly, suppressed is complete separation of the sheet 140 into two pieces caused by splitting the sheet 140 at the split line 145 too much.

In the present example, the through hole 47 is formed in the other end portion of the split line 145. The split line 145 is the perforated line 145 also in the present example. The through hole 47 is larger than each perforation 46 forming the perforated line 145. The through hole 47 is formed into a circular shape. Accordingly, a split of the sheet 140 beyond the other end portion of the split line 45 is suppressed. The through hole 47 is formed by punching process on the sheet 140, for example. A part of the sheet 140 is removed in a portion of the through hole 47. A part of the sheet 140 is only cut in the portion of the perforation 46, and is not removed. A part of the sheet 140 may be removed to be a smaller piece than the through hole 47 in the portion of the perforation 46. The plurality of through holes 47 may be intermittently formed to be a perforated line 145 in place of the plurality of small perforations 46.

In the present example, the wire-like transmission members 30A and 30B are fixed to the sheet 140 at a plurality of positions at intervals along the extension direction. The sheet 140 and the wire-like transmission members 30A and 30B are fixed to each other via a spot fixing part 60 partially fixed along the extension direction of the wire-like transmission members 30A and 30B. The plurality of spot fixing parts 60 are provided at intervals along the extension direction of the wire-like transmission member 30. The interval between the spot fixing parts 60 is not particularly limited, but can be appropriately set. The spot fixing parts 60 have such a configuration, thus a region where the wire-like transmission member 30 and the sheet 140 are fixed is reduced, and a fixing operation is easily performed.

As illustrated in FIG. 8, the spot fixing part 60 where the wire-like transmission member 30A and the sheet 140 are fixed is located in the folded part 54 of the sheet part 50A in the wiring member 110F. Accordingly, when the wire-like transmission member 30A is folded back together with the sheet part 50A, the wire-like transmission member 30A is hardly separated from the sheet part 50A. The wire-like transmission member 30A is hardly caught in a surrounding member. Furthermore, the spot fixing part 60 is located in a region where the folded part 54 and a part which is not folded back are overlapped with each other. Accordingly, when the wire-like transmission member 30A is folded back together with the sheet part 50A, the wire-like transmission member 30A is separated from the sheet part 50A more hardly.

The wiring member 110F illustrated in FIG. 8 corresponds to the wiring member 10F1 illustrated in FIG. 3. Needless to say, a wiring member folded back in a manner different from the wiring member 110F may be manufactured.

Embodiment 3

Figure 9:
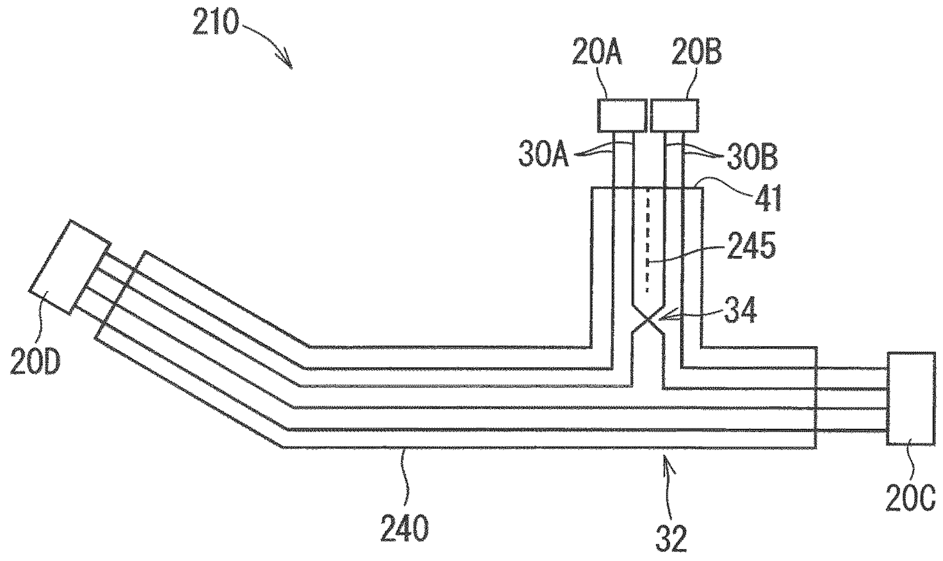
FIG. 9 is a schematic plan view illustrating a wiring member according to an embodiment 3.
Figure 10:
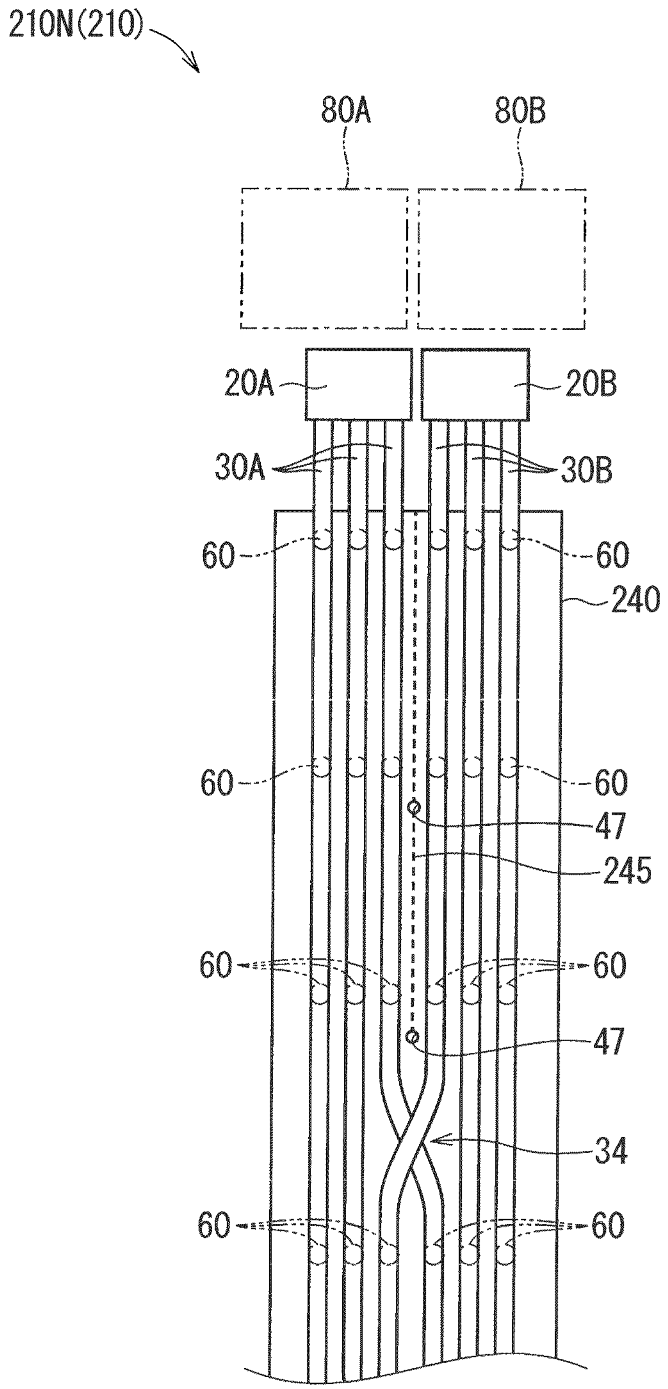
FIG. 10 is a partial enlarged view of FIG. 9, and is a diagram illustrating the wiring member corresponding to the first part number.
Figure 11:
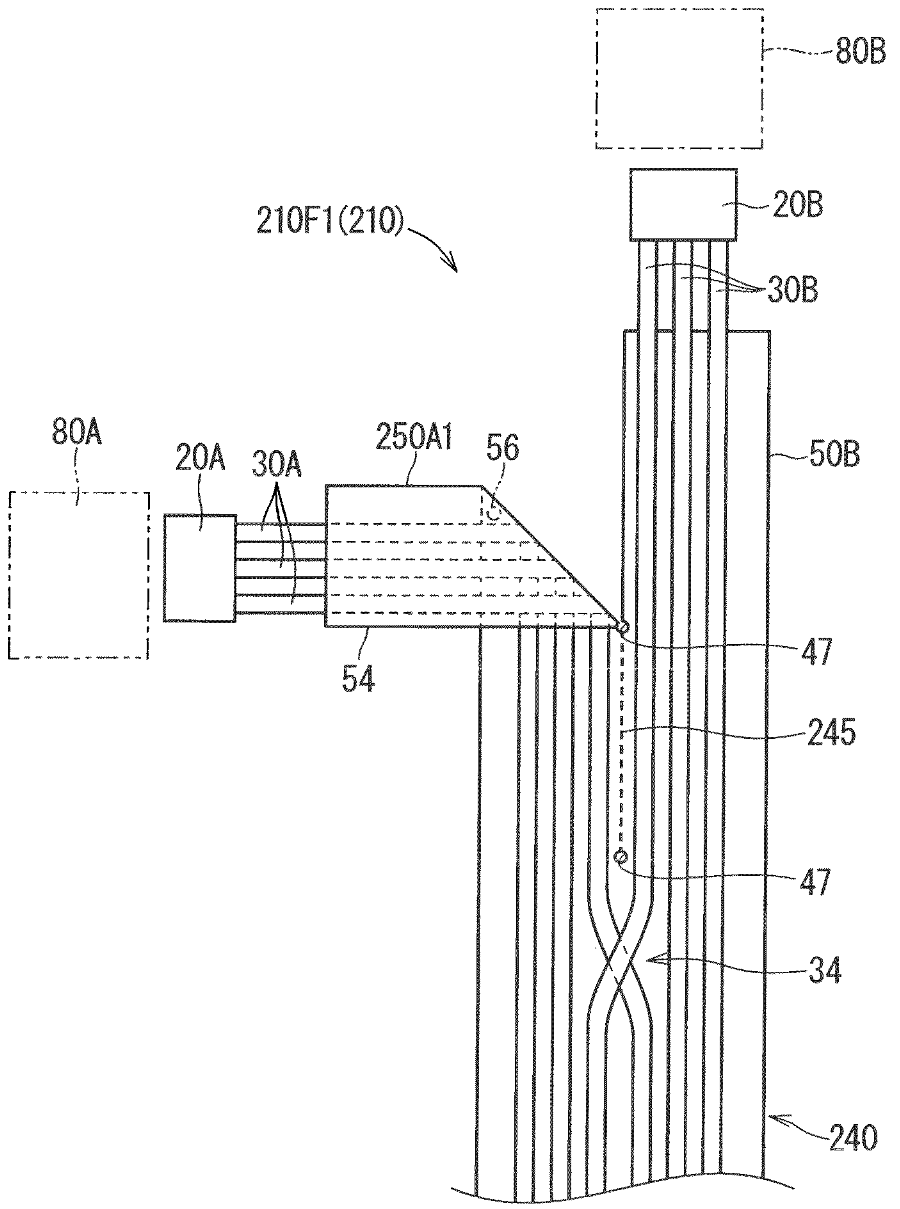
FIG. 11 is a diagram illustrating the wiring member corresponding to the second part number.
Figure 12:
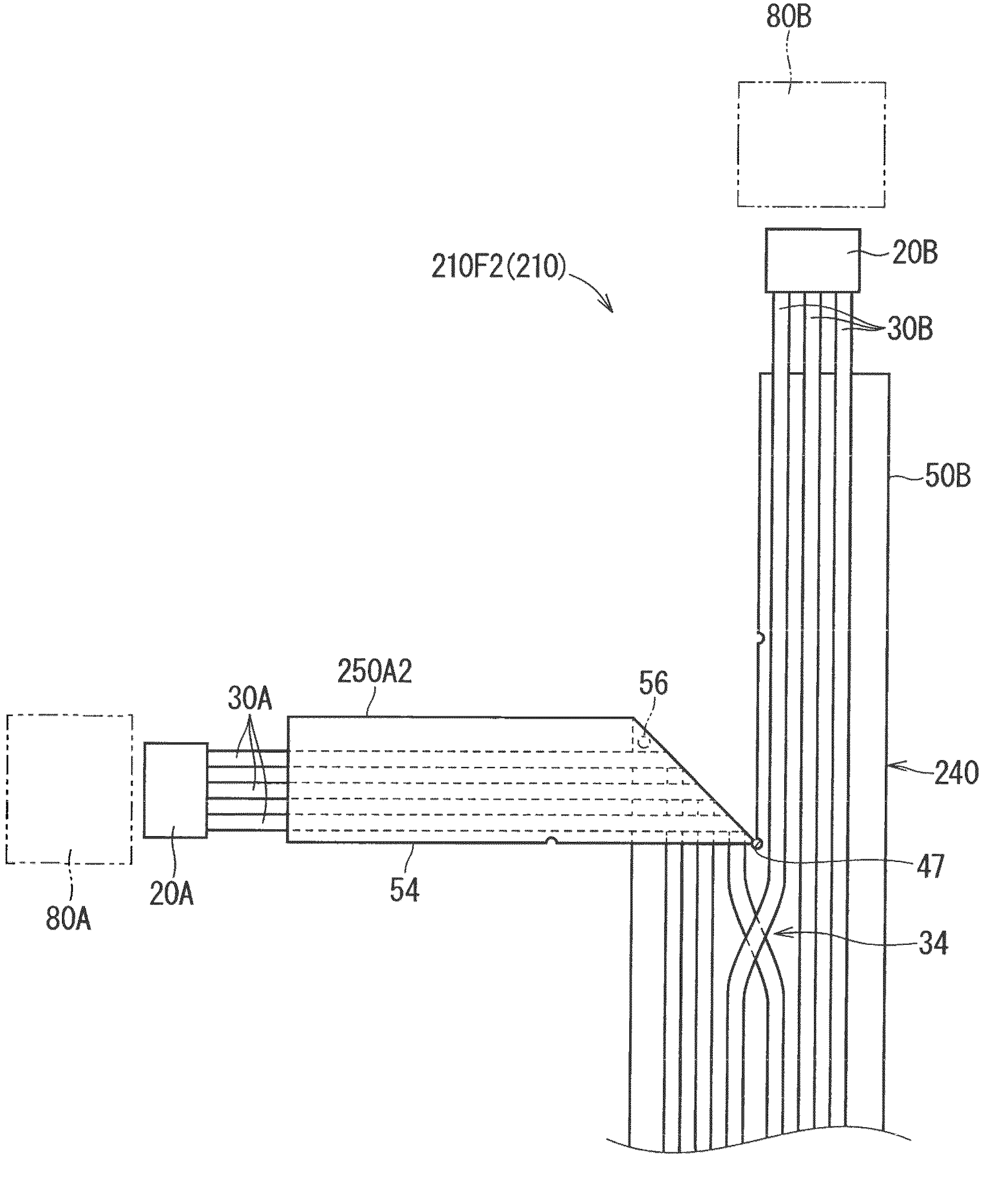
FIG. 12 is a diagram illustrating the wiring member corresponding to the third part number.

A wiring member according to an embodiment 3 is described. FIG. 9 is a schematic plan view illustrating a wiring member 210 according to an embodiment 3. FIG. 10 is a partial enlarged view of FIG. 9, and is a diagram illustrating a wiring member 210N corresponding to the first part number. FIG. 11 is a diagram illustrating a wiring member 210F1 corresponding to the second part number. FIG. 12 is a diagram illustrating a wiring member 210F2 corresponding to the third part number.

In the wiring member 210 according to the present example, a planar shape of a sheet 240 is different from that of the sheet 40 in the wiring member 10 described above. In the example illustrated in FIG. 9, the routes of the wire-like transmission members 30A and 30B on the sheet 240 are made up of a combination of a straight route and a bended route. The sheet 240 is also formed into a shape of a combination of a straight route and a bending route. A part of the plurality of wire-like transmission members 30 including a branch part 32 is fixed to the sheet 240. A shape of the branch part 32 is thereby maintained. The sheet 240 is also formed into a branch shape corresponding to the branch part 32. A major section of the wire-like transmission member 30 along the extension direction is fixed to the sheet 240, and a major route of the wire-like transmission member 30 can be kept in a route similar to a predetermined route in a vehicle. Accordingly, when the wiring member 210 is assembled to the vehicle, the wire-like transmission member 30 can be simply routed along the predetermined route.

The wiring member 210 according to the present example is different from the wiring member 10 described above in that an intersection part 34 is provided. The intersection part 34 is a part where the wire-like transmission members 30A and 30B intersect with each other on the sheet 240. The intersection part 34 is located in a position away from a split line 245. The intersection part 34 is located in a position farther away from the first end portion 41 than the other end portion of the split line 245. Accordingly, the wire-like transmission member 30 extending across the split line 245 hardly occurs in the wiring member 210, thus when the sheet 240 is split using the split line 245, the intersection part 34 as an obstacle is suppressed. There is no wire-like transmission member 30 extending across the split line 45 in the wiring member 210. The wire-like transmission member 30A and 30B do not extend across the split line 45.

For example, the intersection part 34 is provided to change an arrangement order of the wire-like transmission members 30A and 30B. In the example illustrated in FIG. 9, the wire-like transmission member 30A connecting the connectors 20A and 20C and the wire-like transmission member 30B connecting the connectors 20B and 20D intersect with each other in the intersection part 34. The wire-like transmission members 30A and 30B having the other end portions connected to the same connector 20 (connector 20C, for example) may intersect with each other in the intersection part 34.

The intersection part 34 and the spot fixing part 60 may be applied to one wiring member. In this case, as illustrated in FIG. 10, it is sufficient that the spot fixing part 60 is provided in a position of sandwiching the intersection part 34 in the wire-like transmission members 30A and 30B constituting the intersection part 34.

In the wiring member 210 according to the present example, as illustrated in FIG. 10, the through hole 47 is formed in a position in the intermediate part of the split line 245 in the sheet 240. Accordingly, a split of the sheet 240 by the split line 245 is suspended in the position of the through hole 47 in the intermediate part. The through hole 47 can be a rough indication of an amount of splitting the split line 245 in a case where an amount of splitting the split line 245 is different depending on a part number. The through hole 47 may have a configuration similar to the through hole 47 described above provided to the other end portion of the split line 245.

In the wiring member 210F1 illustrated in FIG. 11, the split line 245 is split to the through hole 47 in the intermediate part, and the sheet part 250A1 is folded back to constitute the folded part 54. At this time, the through hole 47 is located, thus the amount of split can be set to have a constant value even in a case where the split line 45 is split to the intermediate part. The split line 245 is left between the through hole 47 in the intermediate part and the other end portion of the split line 245. Even in this case, the through hole 47 is located in the intermediate part, thus suppressed is a split of the split line 245 which is left from a part thereof which has been left as a start point.

In the wiring member 210F2 illustrated in FIG. 12, the split line 245 is split to the through hole 47 in the other end portion, and the sheet part 250A2 longer than the sheet part 250A1 is folded back to constitute the folded part 54. Needless to say, a wiring member folded back in a manner different from the wiring members 210F1 and 210F2 may be manufactured.

Embodiment 4

Figure 13:
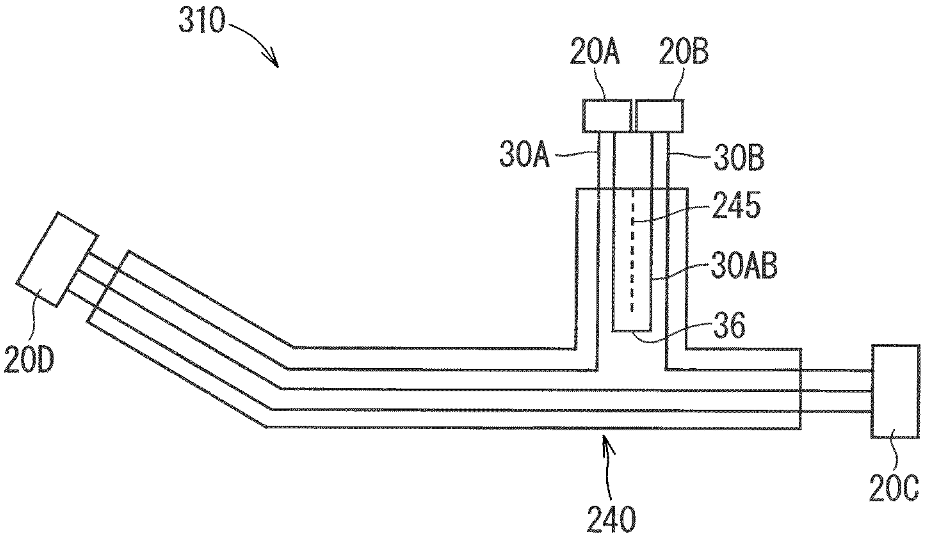
FIG. 13 is a schematic plan view illustrating a wiring member according to an embodiment 4.
Figure 14:
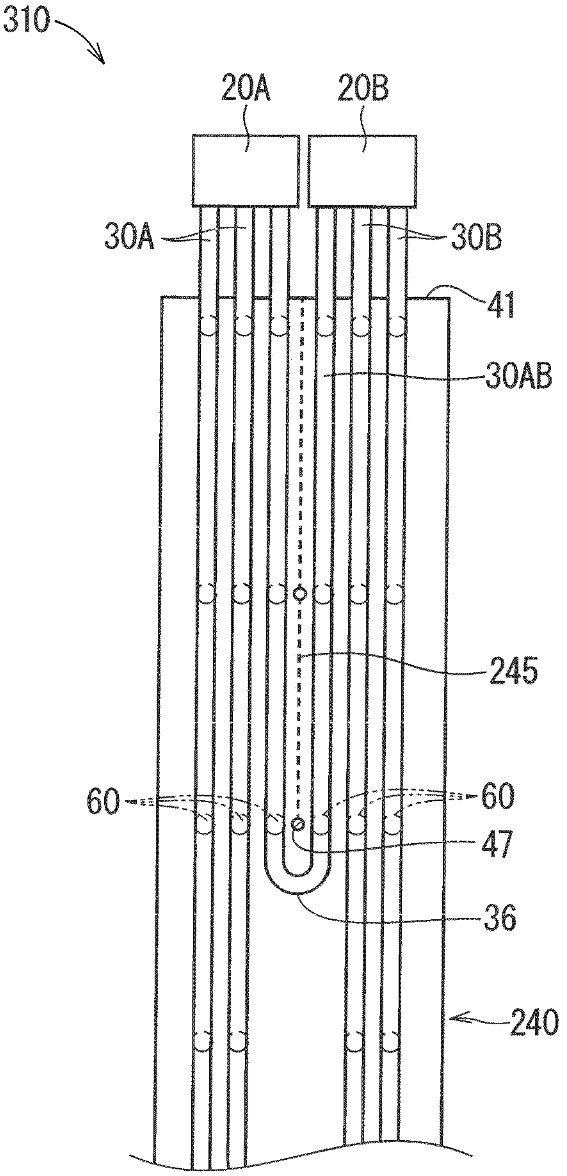
FIG. 14 is a partial enlarged view of FIG. 13.

A wiring member according to an embodiment 4 is described. FIG. 13 is a schematic side view illustrating a wiring member 310 according to the embodiment 4. FIG. 14 is a partial enlarged view of FIG. 13.

The wiring member 310 is different from the wiring member 10 in that the wiring member 310 further includes a wire-like transmission member 30AB. The wire-like transmission member 30AB connects the connector 20A and the connector 20B. One end portion of the wire-like transmission member 30AB is connected to the connector 20A. The other end portion of the wire-like transmission member 30AB is connected to the connector 20B. The wire-like transmission member 30AB is an example of the third wire-like transmission member.

An intermediate part of the wire-like transmission member 30AB makes a U-turn on the sheet 240. The wire-like transmission member 30AB includes a U-turn part 36. The U-turn part 36 is located in a position farther away from the first end portion 41 than the other end portion of the split line 45. The wire-like transmission member 30AB extends on one side of the split line 245 in the sheet 240 from the U-turn part 36 toward one end portion connected to the connector 20A. The wire-like transmission member 30AB extends on the other side of the split line 245 in the sheet 240 from the U-turn part 36 toward the other end portion connected to the connector 20B. Accordingly, even when the wire-like transmission member 30AB connecting the connector 20A and the connector 20B is located, the wiring member can easily correspond to the plurality of part numbers with a simple configuration.

The U-turn part 36 and the spot fixing part 60 may be applied to one wiring member. In this case, as illustrated in FIG. 14, the spot fixing part 60 may be provided in front and back positions of sandwiching the U-turn part 36 in the wire-like transmission member 30AB. Accordingly, a part of the wire-like transmission member 30AB including the U-turn part 36 hardly comes off of the sheet 240.

FIG. 13 illustrates a wiring member 310 which is not folded back. The wiring member 310 can be a wiring member which is folded back when various folding state described above is applied.

APPENDIX

The configurations described in the embodiments and modification examples thereof can be appropriately combined as long as they are not contradictory. For example, in the embodiment 1, the fixing part where the sheet 40 and the wire-like transmission member 30 are fixed may be the spot fixing part 60. For example, the fixing parts where the sheets 140 and 240 and the wire-like transmission member 30 are fixed may be continuously provided along the extension direction of the wire-like transmission member 30. For example, the intersection part 34 and the U-turn part 36 may be applied to one wiring member.

EXPLANATION OF REFERENCE SIGNS

10, 10F, 10F1, 10F2, 10N, 110, 110F, 110N, 210, 210F1, 210F2, 210N, 310 wiring member
20, 20A, 20B, 20C, 20D connector
30, 30A, 30B, 30AB wire-like transmission member
32 branch part
34 intersection part
36 U-turn part
40, 140, 240 sheet
41 first end portion
42 second end portion
43 side edge
44 margin part
45, 145, 245 perforated line (split line)
46 perforation
47 through hole
50A, 50B, 250A1, 250A2 sheet part
52 sheet body
54 folded part
56 sheet fixing part
60 spot fixing part
80A, 80B other side connector
L fold line
T adhesive tape

The invention claimed is:

1. A wiring member, comprising:
a first connector and a second connector;
a first wire-like transmission member connected to the first connector;
a second wire-like transmission member connected to the second connector; and
a sheet to which the first wire-like transmission member and the second wire-like transmission member are fixed, wherein a split line for splitting the sheet is formed in the sheet;

a third wire-like transmission member having one end portion connected to the first connector and another end portion connected to the second connector, and wherein the first wire-like transmission member and the second wire-like transmission member extend on the sheet in parallel to each other so that an end portion of the first wire-like transmission member connected to the first connector and an end portion of the second wire-like transmission member connected to the second connector are directed to a first end portion of the sheet, wherein an intermediate part of the third wire-like transmission member is located in a position farther away from the first end portion than the split line, the third wire-like transmission member extends on one side of the split line in the sheet from the intermediate part of the third wire-like transmission member toward the one end portion of the third wire-like transmission member, and extends on another side of the split line in the sheet from the intermediate part of the third wire-like transmission member toward the another end portion of the third wire-like transmission member;

the split line extends between the first wire-like transmission member and the second wire-like transmission member, one end portion of the split line reaches an edge of the first end portion, and another end portion of the split line is located in an intermediate region between the first end portion and a second end portion of the sheet.

2. The wiring member according to claim 1, wherein a through hole is formed in a position of an intermediate part of the split line in the sheet.

3. The wiring member according to claim 1, wherein the sheet is split at the split line to be separated into a first sheet part to which the first wire-like transmission member is fixed and a second sheet part to which the second wire-like transmission member is fixed, and the first sheet part is folded back.

4. The wiring member according to claim 3, wherein the sheet includes a base part overlapped with a folded back part of the first sheet part, and the base part and the folded back part are fused and fixed to each other.

5. The wiring member according to claim 3, wherein the first wire-like transmission member is fixed to the sheet at a plurality of positions at intervals along an extension direction, and a position where the first wire-like transmission member and the sheet are fixed to each other is located in a folded part of the first sheet part.

6. A wiring member, comprising:

a first connector and a second connector;

a first wire-like transmission member connected to the first connector;

a second wire-like transmission member connected to the second connector; and a sheet to which the first wire-like transmission member and the second wire-like transmission member are fixed, wherein the first wire-like transmission member and the second wire-like transmission member extend on the sheet in parallel to each other so that an end portion of the first wire-like transmission member connected to the first connector and an end portion of the second wire-like transmission member connected to the second connector are directed to a first end portion of the sheet, a split line for splitting the sheet is formed in the sheet, the split line extends between the first wire-like transmission member and the second wire-like transmission member, one end portion of the split line reaches an edge of the first end portion, and wherein an intersection part where the first wire-like transmission member and the second wire-like transmission member intersect with each other on the sheet is located in a position away from the split line.

7. A wiring member, comprising:

a first connector and a second connector;

a first wire-like transmission member connected to the first connector;

a second wire-like transmission member connected to the second connector; and a sheet to which the first wire-like transmission member and the second wire-like transmission member are fixed, wherein the first wire-like transmission member and the second wire-like transmission member extend on the sheet in parallel to each other so that an end portion of the first wire-like transmission member connected to the first connector and an end portion of the second wire-like transmission member connected to the second connector are directed to a first end portion of the sheet, a split line for splitting the sheet is formed in the sheet, the split line extends between the first wire-like transmission member and the second wire-like transmission member, one end portion of the split line reaches an edge of the first end portion, wherein the sheet is split at the split line to be separated into a first sheet part to which the first wire-like transmission member is fixed and a second sheet part to which the second wire-like transmission member is fixed, wherein the first sheet part is folded back to extend across the second sheet part, and the first sheet part and the second sheet part overlapped with each other are fixed to each other.

* * * * *